US012350945B2

(12) United States Patent
Imamura

(10) Patent No.: US 12,350,945 B2
(45) Date of Patent: Jul. 8, 2025

(54) PRINTING APPARATUS AND METHOD OF PRINTING FOR INTERMITTENTLY TRANSPORTING A MEDIUM

(71) Applicant: SEIKO EPSON CORPORATION, Tokyo (JP)

(72) Inventor: Atsushi Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 194 days.

(21) Appl. No.: 18/188,787

(22) Filed: Mar. 23, 2023

(65) Prior Publication Data

US 2023/0302829 A1 Sep. 28, 2023

(30) Foreign Application Priority Data

Mar. 25, 2022 (JP) ................................ 2022-049654

(51) Int. Cl.

| | |
|---|---|
| ***B41J 25/00*** | (2006.01) |
| ***B41J 11/00*** | (2006.01) |
| ***B41J 15/04*** | (2006.01) |
| ***B41J 25/304*** | (2006.01) |
| *B41J 15/08* | (2006.01) |
| *B41J 19/14* | (2006.01) |

(52) U.S. Cl.

CPC ......... *B41J 25/006* (2013.01); *B41J 11/0085* (2013.01); *B41J 15/04* (2013.01); *B41J 25/001* (2013.01); *B41J 25/304* (2013.01); *B41J 15/08* (2013.01); *B41J 19/142* (2013.01)

(58) Field of Classification Search

CPC ...... B41J 25/006; B41J 11/0085; B41J 15/04; B41J 25/001; B41J 25/304; B41J 15/08; B41J 19/142

See application file for complete search history.

(56) References Cited

U.S. PATENT DOCUMENTS

| | | | | |
|---|---|---|---|---|
| 5,615,959 | A | 4/1997 | Nishizawa et al. | |
| 6,450,611 | B1 | 9/2002 | Brown et al. | |
| 8,964,238 | B2 | 2/2015 | Miura | |
| 2010/0129129 | A1* | 5/2010 | Katayama | B41J 11/008 400/582 |
| 2020/0398565 | A1* | 12/2020 | Ihara | B41J 11/00242 |
| 2021/0237477 | A1* | 8/2021 | Takekoshi | B41J 2/16508 |

FOREIGN PATENT DOCUMENTS

JP 2012-152957 A 8/2012

* cited by examiner

*Primary Examiner* — Henok D Legesse

(74) *Attorney, Agent, or Firm* — WORKMAN NYDEGGER

(57) ABSTRACT

A printing apparatus includes a transport unit that intermittently transports a medium, a support portion that supports the medium, a head that performs printing by discharging a liquid onto the medium supported by the support portion during a period in which the transport of the medium by the transport unit is stopped, a carriage at which the head is mounted and that moves relative to the medium, and a control unit. The control unit starts the movement of the carriage before the transport of the medium by the transport unit is completed, and starts the discharge of the liquid by the head after the transport of the medium by the transport unit is completed.

6 Claims, 8 Drawing Sheets

PRINTING APPARATUS AND METHOD OF PRINTING FOR INTERMITTANTLY TRANSPORTING A MEDIUM

The present application is based on, and claims priority from JP Application Serial Number 2022-049654, filed Mar. 25, 2022, the disclosure of which is hereby incorporated by reference herein in its entirety.

BACKGROUND

1. Technical Field

The present disclosure relates to a printing apparatus and a method of printing.

2. Related Art

In JP-A-2012-152957, a printing apparatus is described that includes a head for discharging a liquid onto a medium, a carriage on which the head is mounted, and a transport unit that transports the medium. During a period in which the transport of the medium by the transport unit is stopped, the head discharges the liquid onto the medium while moving together with the carriage. During a period in which the carriage stops, the transport unit transports the medium.

With such a printing apparatus, there is demand for improvements in productivity.

SUMMARY

A printing apparatus that solves the problem described above includes a transport unit configured to intermittently transport a medium, a support portion configured to support the medium, a head configured to perform printing by discharging a liquid onto the medium supported by the support portion, during a period in which the transport of the medium by the transport unit is stopped, a carriage at which the head is mounted and that is configured to move relative to the medium, and a control unit, wherein the control unit starts the movement of the carriage before the transport of the medium by the transport unit is completed and starts the discharge of the liquid by the head after the transport of the medium by the transport unit is completed.

A method of printing that solves the problem described above includes starting movement of a carriage before transport of a medium by a transport unit is completed and starting discharge of a liquid by a head mounted at the carriage after the transport of the medium by the transport unit is completed.

DESCRIPTION OF EXEMPLARY EMBODIMENTS

An exemplary embodiment of a printing apparatus will be described below with reference to the accompanying drawings. The printing apparatus is, for example, an ink jet-type printer that prints an image of characters, photographs, and the like on a medium such as a sheet and fabric by discharging ink, which is an example of a liquid. The printing apparatus is, for example, a label printer.

Configuration of Printing Apparatus

Figure 1:
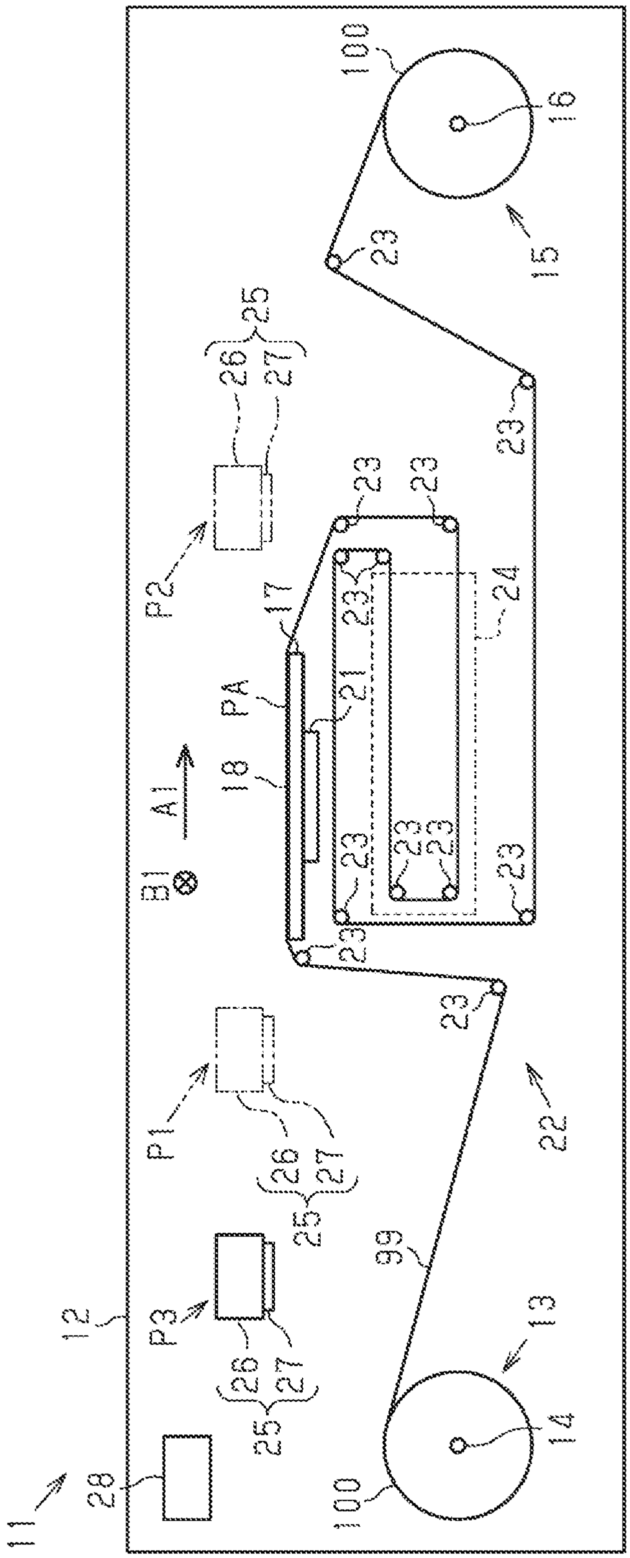
FIG. 1 is a side view illustrating an exemplary embodiment of a printing apparatus.

As illustrated in FIG. 1, a printing apparatus 11 includes a housing 12.

The printing apparatus 11 includes a feeding unit 13 that feeds a medium 99. The feeding unit 13 is configured to feed the medium 99. The feeding unit 13 is accommodated in the housing 12, for example. The feeding unit 13 includes a feeding shaft 14. The feeding shaft 14 rotatably holds a roll body 100 around which the medium 99 is wound. The feeding shaft 14 holds the medium 99 before printing. As the feeding shaft 14 rotates, the medium 99 is fed from the feeding unit 13. The feeding shaft 14 may be driven to rotate by a motor, or may be driven to rotate as a result of the medium 99 being pulled.

The printing apparatus 11 includes a winding unit 15. The winding unit 15 is configured to take up the medium 99. The winding unit 15 is accommodated in the housing 22, for example. The winding unit 15 includes a winding shaft 16. Similarly to the feeding shaft 14, the winding shaft 16 rotatably holds the roll body 100. The winding shaft 16 holds the medium 99 after the printing. As the winding shaft 16 rotates, the winding unit 15 takes up the medium 99. The winding shaft 16 is driven to rotate by a motor, for example.

The printing apparatus 11 includes a support portion 17. The support portion 17 supports the medium 99. The support portion 17 is accommodated in the housing 12, for example. The support portion 17 support the medium 99 from below, for example. The support portion 17 supports the medium 99 in a process from when the medium 99 is fed from the feeding unit 13 until when the medium 99 is taken up by the winding unit 15.

Figure 2:
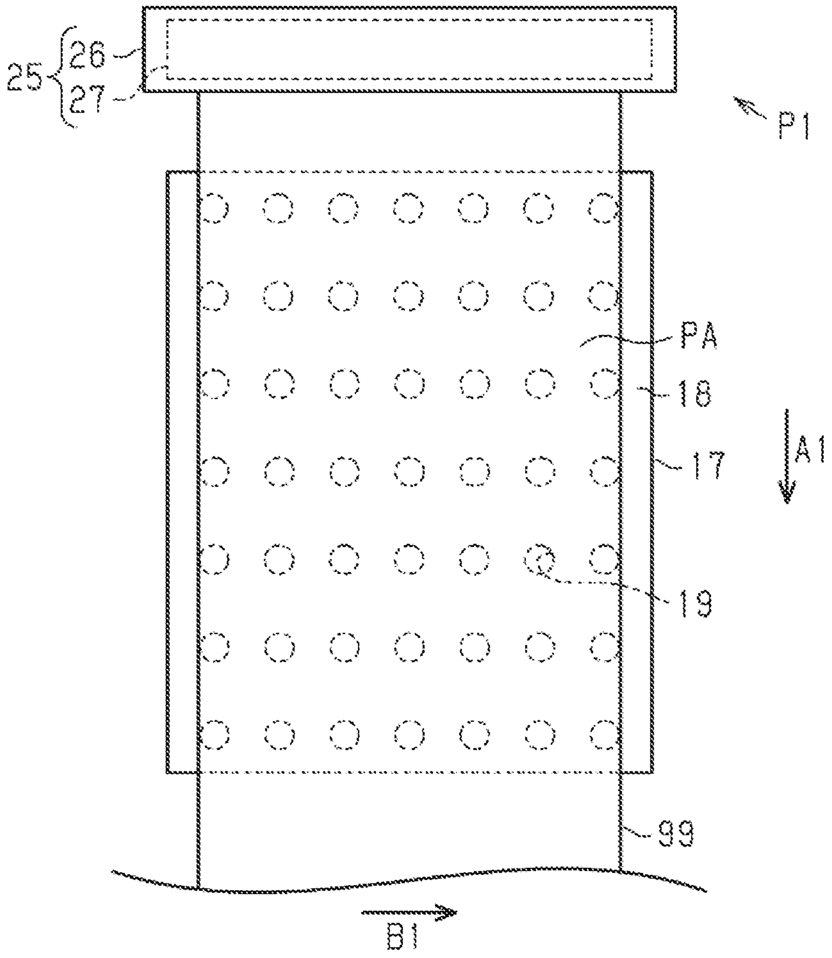
FIG. 2 is a plan view of a support portion as viewed from above.

As illustrated in FIG. 2, the support portion 17 includes a support face 18. The support face 18 is a surface that comes into contact with the medium 99 at the support portion 17. The support face 18 faces upward at the support portion 17, for example. When the support portion 17 is viewed from a position facing the support face 18, that is, when the support portion 17 is viewed from above, the support face 18 overlaps with the medium 99.

Of the medium 99, a region supported by the support portion 17 is a printing region PA. In the printing apparatus 11, the printing is performed on the printing region PA of the medium 99. The printing region PA is a region, of the medium 99, that overlaps with the support portion 17 when the support portion 17 is viewed from a position facing the support face 18. In other words, when the support portion 17 is viewed in plan view, the printing region PA overlaps with the support face 18. The printing region PA is, for example, the entire region of the medium 99 supported by the support portion 17. The printing region PA is not limited to the entire region of the medium 99 supported by the support portion 17, but may be a portion of the region supported by the support portion 17. The printing region PA refers to the maximum region on which the printing apparatus 11 can perform the printing, of the region supported by the support portion 17.

The support portion 17 includes one or a plurality of through-holes 19. The through-hole 19 opens to the support face 18. The through-hole 19 is covered by the medium 99 positioned on the support face 18, for example.

As illustrated in FIG. 1, the printing apparatus 11 includes a sucking unit 21. The sucking unit 21 is configured to cause the medium 99 to be sucked to the support portion 17. The sucking unit 21 sucks the medium 99 against the support portion 17, for example, by suctioning the medium 99 through the support portion 17. The sucking unit 21 includes a suction pump, for example. The sucking unit 21 suctions the medium 99 through the through-hole 19. As a result, the medium 99 is sucked to the support face 18. The sucking unit 21 may cause the medium 99 to be sucked to the support portion 17 by generating static electricity, for example.

The sucking unit 21 can change the sucking force thereof, for example, by controlling the suction force. The sucking unit 21 changes the sucking force, for example, in accordance with the transport of the medium 99. For example, when the medium 99 is being transported, the sucking force of the sucking unit 21 is reduced compared to when the transport of the medium 99 is stopped. When the medium 99 is being transported, the sucking unit 21 causes the sucking force thereof to be relatively small. By causing the sucking force of the sucking unit 21 to be relatively small when the medium 99 is being transported, the medium 99 can easily move on the support portion 17. When the printing is performed on the medium 99, that is, when the transport of the medium 99 is stopped, the sucking unit 21 causes the sucking force thereof to be relatively large. By causing the sucking force of the sucking unit 21 to be relatively large when the transport of the medium 99 is stopped, the position of the medium 99 is less likely to be displaced on the support portion 17.

The printing apparatus 12 includes a transport unit 22. The transport unit 22 is configured to transport the medium 99. The transport unit 22 is accommodated in the housing 12, for example. The transport unit 22 transports the medium 99 from the feeding unit 13 toward the winding unit 15. The transport unit 22 transports the medium 99 on the support portion 17 in a transport direction A1. The transport direction A1 indicates a direction in which the medium 99 moves on the support portion 17.

The transport unit 22 transports a portion, of the medium 99, that has passed over the support portion 17 toward below the support portion 17. In other words, the printed medium 99 is transported by the transport unit 22 from the support portion 17 toward below the support portion 17.

The transport unit 22 transports the medium 99 intermittently. In other words, the transport unit 22 repeatedly starts and stops the transport. The transport unit 22 stops the transport of the medium 99, when the printing on the medium 99 is being performed. The transport unit 22 starts the transport of the medium 99, when the printing on the medium 99 is not being performed, for example, when the printing on the medium 99 is completed. In the printing apparatus 11, the printing of the medium 99 and the transport of the medium 99 are alternately repeated. Note that, here, the completion of the printing on the medium 99 refers to a timing at which the printing is completed during a period in which the medium 99 is stopped between two transport cycles in the intermittent transport of the medium 99, on a region on which a printing unit 25, which will be described below, is to perform the printing.

The transport unit 22 includes at least one transport roller 23. The transport roller 23 is positioned in the housing 12, for example. The transport roller 23 rotates and thus transports the medium 99. The medium 99 is wound over the transport roller 23. The transport rollers 23 may sandwich the medium 99. The medium 99 is transported as a result of the transport roller 23 rotating. The transport roller 23 includes a roller that is driven to rotate by a motor, for example. The transport roller 23 is positioned below the support face 18, for example.

The printing apparatus 11 includes a drying unit 24. The drying unit 24 is configured to dry the medium 99 on which the printing has been already performed. The drying unit 24 dries the medium 99 in a process of the medium 99 being transported from the support portion 17 to the winding unit 15. The drying unit 24 is positioned in the housing 12, for example. The drying unit 24 is positioned directly below the support portion 17, for example. The drying unit 24 includes a heater that heats the medium 99, for example. The drying unit 24 may include a fan that blows gas onto the medium 99. In this way, the drying unit 24 dries the medium 99.

The printing apparatus 11 includes the printing unit 25. The printing unit 25 is configured to perform the printing on the medium 99. The printing unit 25 performs the printing on the medium 99 by discharging a liquid onto the medium 99. The printing unit 25 performs the printing on the printing region PA. The printing unit 25 is accommodated in the housing 12, for example. The printing unit 25 includes a carriage 26 and a head 27. The carriage 26 and the head 27 are positioned above the support portion 17, for example.

The head 27 is mounted on the carriage 26. The carriage 26 is configured to move relative to the medium 99. The carriage 26 moves relative to the printing region PA. The carriage 26 moves through a region facing the support portion 17. When the support portion 17 is viewed in plan view, the carriage 26 moves so as to pass over the printing region PA. The carriage 26 moves through a region above the support portion 17, for example.

The carriage 26 is configured to move in the transport direction A1, for example. Specifically, the carriage 26 reciprocates in the transport direction A1. In other words, the carriage 26 moves in the transport direction A1 and in the opposite direction thereto. Thus, the carriage 26 moves in a direction in which the medium 99 moves on the support portion 17. Conversely, the transport unit 22 transports the medium 99 on the support portion 17 in a direction in which the carriage 26 moves.

The carriage 26 may be configured to move in an intersecting direction B1. The intersecting direction B1 is a direction different from the transport direction A1.

Specifically, the intersecting direction B1 is a direction intersecting the transport direction A1 in the plane along the support face 18. The intersecting direction B1 indicates the width direction of the medium 99 to be transported.

The carriage 26 may be configured to move only in the transport direction A1, or may be configured to move in both the transport direction A1 and the intersecting direction B1. In other words, the printing apparatus 11 is a so-called lateral printer. The carriage 26 may be configured to move only in the intersecting direction B1. In this case, the printing apparatus 11 is a so-called serial printer.

In this example, the carriage 26 moves at least in the transport direction A1. Thus, in this example, the intersecting direction B1 indicates a direction in which the carriage 26 provides a line feed as opposed to a direction in which the carriage 26 moves relative to the medium 99. In other words, the intersecting direction B1 indicates a direction in which the carriage 26 or the head 27 provides the line feed as opposed to a direction in which the head 27 moves while discharging the liquid onto the medium 99. The carriage 26 or the head 27 may move along outward and return paths in the intersecting direction B1. In other words, the carriage 26 or the head 27 may move to one side and to the other side, which is the opposite direction from the one side, in the intersecting direction B1, for example.

By the carriage 26 moving, the position of the carriage 26 is changed between a plurality of positions. For example, by the carriage 26 moving in the transport direction A1, the position of the carriage 26 is changed between a first position P1, a second position P2, and a home position P3.

The first position P1 and the second position P2 are positions through which the carriage 26 passes during the printing. The first position P1 is a position upstream from the support portion 17 in the transport direction A1. The second position P2 is a position downstream from the support portion 17 in the transport direction A1. The carriage 26 reciprocates between the first position P1 and the second position P2 during the printing, for example. In a process of the carriage 26 changing its position from the first position P1 to the second position P2, and in a process of the carriage 26 changing its position from the second position P2 to the first position P1, the carriage 26 passes over the support portion 17.

One of the first position P1 and the second position P2 is a start position that is a start position of the printing. The other of the first position P1 and the second position P2 is a return position that is a return position of the printing. The carriage 26 stands by at the start position before the printing is started. When the printing is started, the carriage 26 moves from the start position to the return position. When the carriage 26 reaches the return position, the carriage 26 turns back from the return position toward the start position. With respect to the carriage 26, a movement from the start position side to the return position side may be referred to as an outward movement, and a movement from the return position side to the start position side may be referred to as a return movement.

The home position P3 is a position at which the carriage 26 stands by. The carriage 26 normally stands by at the home position P3. For example, when the printing unit 25 is not performing the printing on the medium 99, the carriage 26 is positioned at the home position P3. The home position P3 is, for example, a position upstream from the support portion 17 in the transport direction A1. Specifically, the home position P3 is a position upstream from the first position P1 in the transport direction A1. The carriage 26 moves from the home position P3 to the start position before the printing is started.

The head 27 includes at least one nozzle. The head 27 discharges the liquid from the nozzle. The head 27 discharges the liquid onto the medium 99 supported by the support portion 17. Specifically, the head 27 discharges the liquid onto the printing region PA. The head 27 discharges the liquid onto the medium 99 while the transport of the medium 99 by the transport unit 22 is stopped. As a result, an image is printed on the medium 99.

The head 27 moves relative to the support portion 17 together with the carriage 26. The head 27 discharges the liquid onto the medium 99 while moving together with the carriage 26. Specifically, the head 27 discharges the liquid onto the medium 99 while moving together with the carriage 26 in one direction. The head 27 discharges the liquid onto the medium 99, for example, while moving together with the carriage 26 in the transport direction A1 or in the opposite direction thereto. When the printing apparatus 11 is a serial printer, the head 27 discharges the liquid onto the medium 99 while moving together with the carriage 26 in the intersecting direction B1 or in the opposite direction thereto.

The width of the head 27 is the same as the width of the medium 99, or longer than the width of the medium 99, for example. In other words, the head 27 is, for example, a line head capable of simultaneously discharging the liquid across the entire width of the medium 99. As a result, the head 27 can discharge the liquid onto the entire region of the printing region PA simply by moving together with the carriage 26 once in the transport direction A1 or in the opposite direction thereto. In other words, the head 27 can perform the printing on the entire region of the printing region PA without causing the carriage 26 to move in the intersecting direction B1.

The width of the head 27 may be shorter than the width of the medium 99. In this case, the head 27 discharge the liquid across the entire width of the medium 99 by moving in both the transport direction A1 and the intersecting direction B1. The head 27 performs the printing across the entire width of the medium, for example, by repeating the movement accompanied by the discharge of the liquid, and the provision of the line feed, that is, by alternately repeating the movement in the transport direction A1 and the movement in the intersecting direction B1. Thus, in this case, the head 27 performs the printing on the entire region of the printing region PA, by the carriage 26 reciprocating in the transport direction A1 and providing the line feed in the intersecting direction B1.

The printing unit 25 performs the printing with a predetermined number of passes. The number of passes refers to a number of times the head 27 moves in order to complete the printing on a predetermined region. The number of passes is, for example, the number of movements of the carriage 26 accompanied by the discharge of the liquid by the head 27. The printing unit 25 performs the printing on the printing region PA in a single pass, for example. In this case, the printing by the head 27 is completed by the carriage 26 passing over the printing region PA once. The printing unit 25 may perform the printing on the printing region PA in multiple passes. In this case, the printing by the head 27 is completed by the carriage 26 passing over the printing region PA a plurality of times.

The printing unit 25 performs unidirectional printing on the medium 99, for example. The unidirectional printing is a printing method in which the movement direction of the carriage 26 accompanied by the discharge of the liquid onto the medium 99 is a single direction. In the unidirectional printing, the printing unit 25 discharges the liquid onto the medium 99 as the printing unit 25 moves in the transport direction A1 or in the opposite direction thereto. In other words, the unidirectional printing is a printing method in which the discharge of the liquid by the head 27 is performed while the carriage 26 is moving on the outward path or on the return path, when the carriage 26 reciprocates relative to the medium 99.

The printing unit 25 may perform bidirectional printing on the medium 99. The bidirectional printing is a printing method in which a movement direction of the carriage 26 accompanied by the discharge of the liquid onto the medium 99 is a plurality of directions. In the bidirectional printing, the printing unit 25 discharges the liquid as the printing unit 25 moves in the transport direction A1 and the opposite direction thereto, for example. In other words, the bidirectional printing is a printing method in which the discharge of the liquid by the head 27 is performed while the carriage 26 is moving on both the outward path and on the return path when the carriage 26 reciprocates relative to the medium 99.

The printing apparatus 11 includes a control unit 28. The control unit 28 comprehensively controls the printing apparatus 11. The control unit 28 controls the sucking unit 21, the transport unit 22, the printing unit 25, and the like, for example. The control unit 28 controls the transport of the medium 99 and the printing on the medium 99. The control unit 28 alternately executes the transport of the medium 99 and the printing on the medium 99.

The control unit 28 may be constituted by one or a plurality of processors that are configured to execute various types of processing in accordance with a computer program. The control unit 28 may be constituted by one or a plurality of dedicated hardware circuits, such as application specific integrated circuits, that are configured to execute at least a portion of various types of processing. The control unit 28 may be constituted by a circuit including a combination of a processor and a hardware circuit. The processor includes a CPU and a memory such as a RAM and a ROM. The memory stores program codes or commands configured to cause the CPU to execute processing. The memory, that is, a computer-readable medium, includes any readable medium that can be accessed by a general purpose or special purpose computer.

Control of Transport and Printing

The control unit 28 controls the transport unit 22 in order to control the starting and stopping of the transport. As a result, the transport unit 22 controls the transport timing of the medium 99. The control unit 28 controls the printing unit 25 to control the starting and stopping of the movement by the carriage 26. The control unit 28 controls the printing unit 25 to control the discharge of the liquid by the head 27 in accordance with the movement of the carriage 26. In other words, the control unit 28 controls the movement timing of the carriage 26 and the discharge timing of the head 27.

Next, with respect to the unidirectional printing, a case where the printing is performed on the outward path, and a case where the printing is performed on the return path will be described. The control unit 28 performs the unidirectional printing on the medium 99 by controlling the transport unit 22, the carriage 26, and the head 27. First, the case where the printing is performed on the outward path is described. Here, when the carriage 26 moves on the outward path, the control unit 28 causes the head 27 to discharge the liquid.

Figure 3:
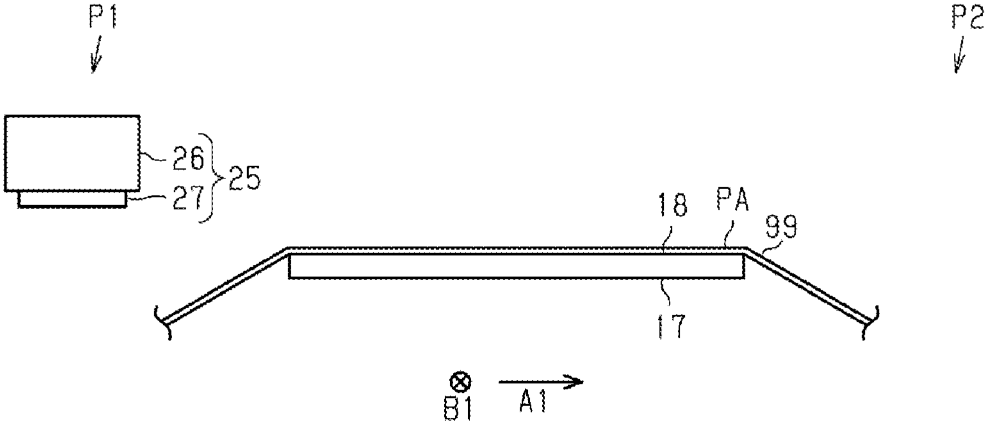
FIG. 3 is a side view when a carriage stands by at a first position in unidirectional printing in which printing is performed on an outward path.

As illustrated in FIG. 3, before the printing is started, the control unit 28 causes the carriage 26 to stand by at the start position, for example, at the first position P1. After that, the control unit 28 moves the carriage 26 from the start position to the return position. In other words, the control unit 28 moves the carriage 26 from the first position P1 to the second position P2. As a result, the carriage 26 and the head 27 move on the outward path. At this time, the control unit 28 starts the movement of the carriage 26 in a state in which the medium 99 is stopped.

Figure 4:
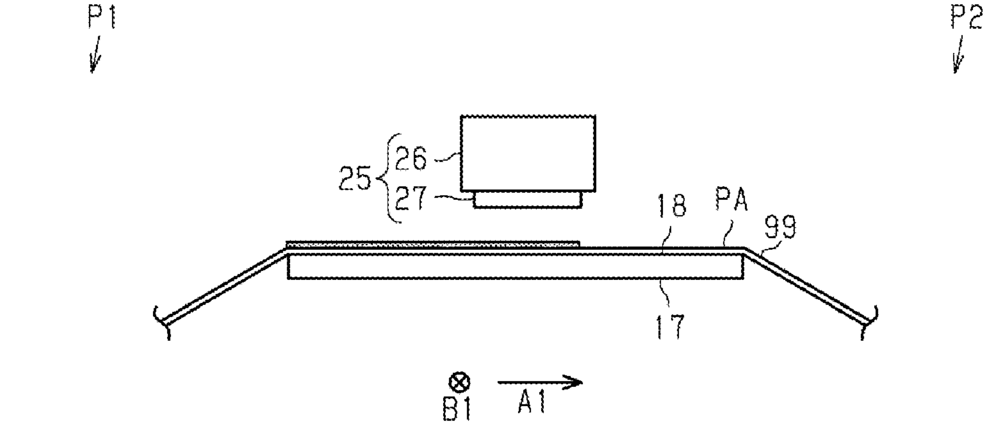
FIG. 4 is a side view when the printing is being performed in the unidirectional printing in which the printing is performed on the outward path.

As illustrated in FIG. 4, the control unit 28 causes the head 27 to discharge the liquid as the carriage 26 moves over the printing area PA. As a result, an image is printed on the printing region PA. The control unit 28 causes the head 27 to discharge the liquid while moving the carriage 26 relative to the printing region PA.

Figure 5:
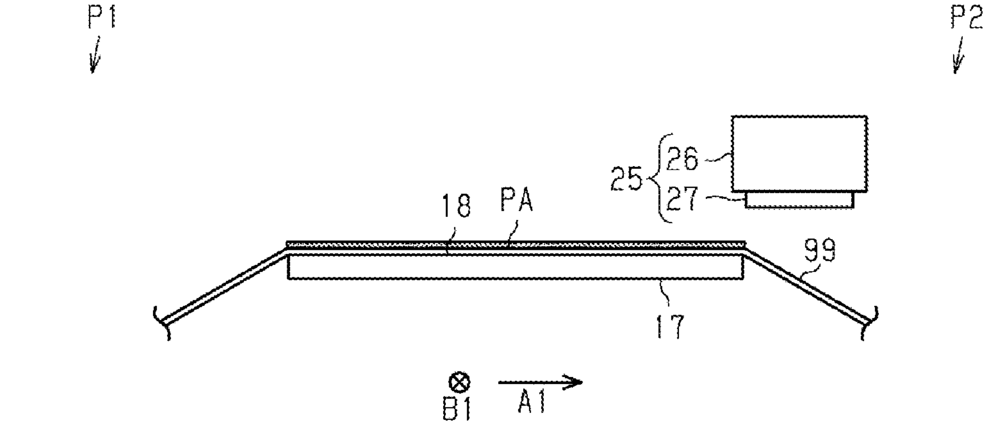
FIG. 5 is a side view of a state after the printing in the unidirectional printing in which the printing is performed on the outward path.
Figure 6:
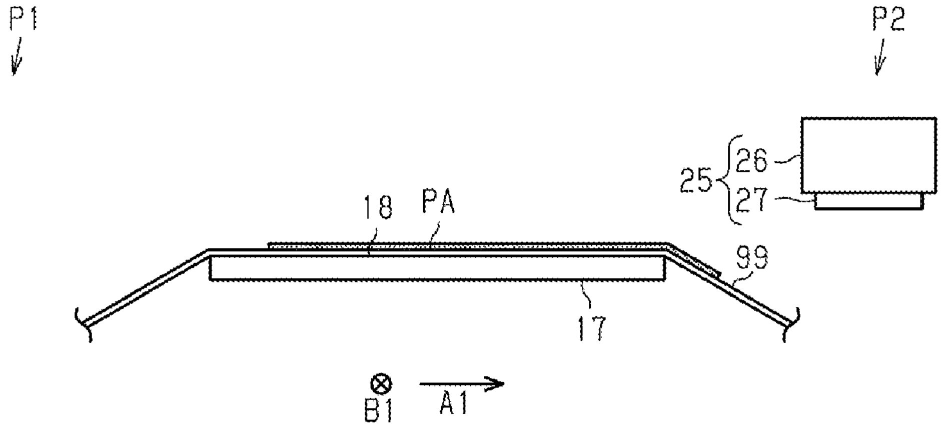
FIG. 6 is a side view when the carriage is positioned at a second position in the unidirectional printing in which the printing is performed on the outward path.

As illustrated in FIG. 5 and FIG. 6, the control unit 28 starts the transport of the medium 99 by the transport unit 22 after the discharge of the liquid by the head 27 is completed and before the carriage 26 stops. The control unit 28 starts the transport of the medium 99 by the transport unit 22, for example, after the discharge of the liquid by the head 27 is completed, and before the carriage 26 reaches the second position P2. In other words, the control unit 28 executes the movement of the carriage 26 in parallel with the transport of the medium 99. At this time, while the carriage 26 moves in the transport direction A1, the medium 99 moves in the transport direction A1. As a result, productivity of the printing apparatus 11 is improved compared to a case where the transport of the medium 99 is started after the carriage 26 stops. The control unit 28 improves the productivity of the printing apparatus 11 by causing the movement period of the carriage 26 and the transport period of the medium 99 to coincide with each other.

The control unit 28 may start the transport of the medium 99 by the transport unit 22, for example, after the head 27 has passed over the printing region PA and before the carriage 26 stops. Specifically, the control unit 28 may start the transport of the medium 99 by the transport unit 22 after a state is obtained in which the head 27 no longer overlaps with the printing region PA when the support portion 17 is viewed in plan view, and before the carriage 26 reaches the second position P2.

When the transport of the medium 99 is started immediately after the printing is completed, the medium 99 may be transported in a state in which the head 27 is positioned over the support portion 17. In other words, the medium 99 may be transported in a state in which the head 27 overlaps with the printing region PA. In this case, the head 27 may come into contact with the medium 99. Particularly, since the sucking force of the sucking unit 21 is reduced when the medium 99 is being transported, the medium 99 is more likely to be lifted from the support portion 17. Further, a portion, of the medium 99, onto which the liquid has been discharged swells. Thus, if the transport of the medium 99 is started in the state in which the head 27 overlaps with the printing region PA, a printed portion of the medium 99 is more likely to come into contact with the head 27. In contrast, by starting the transport of the medium 99 after the head has passed over the support portion 17, the risk of the printed portion of the medium 99 coming into contact with the head 27 is reduced.

The control unit 28 may start the transport of the medium 99 by the transport unit 22, for example, after the liquid last discharged from the head 27 has landed on the medium 99 and before the carriage 26 stops. For example, by counting the time elapsed from when the liquid was discharged from the head 27, the control unit 28 detects the landing of the liquid on the medium 99. Therefore, the control unit 28 may start the transport of the medium 99 by the transport unit 22 after a predetermined time period has elapsed from when the liquid was last discharged from the head 27, and before the carriage 26 stops. If the transport of the medium 99 by the transport unit 22 is started before the liquid discharged from the head 27 lands on the medium 99, the landing position of the liquid may be displaced. In contrast, by starting the transport of the medium 99 after the liquid last discharged from the head 27 has landed on the medium 99, the productivity of the printing apparatus 11 is improved while suppressing deterioration in the printing quality. Furthermore, the transport of the medium 99 by the transport unit 22 may be started after the liquid last discharged from the head 27 has landed on the medium 99, after the head 27 has passed over the landing position of the liquid last discharged from the head 27, and before the carriage 26 stops. In this way, in addition to the effect described above, the risk of the printed medium 99 coming into contact with the head 27 is reduced.

The liquid last discharged from the head 27 refers to the liquid discharged by the head 27 immediately before the transport of the medium 99 is started. In the printing apparatus 11, the transport of the medium 99 and the printing on the medium 99 are alternately executed. Thus, the discharge of the liquid executed immediately before the transport of the medium 99 is started is the last discharge of the liquid, in one print cycle.

The control unit 28 may start the transport of the medium 99 by the transport unit 22 after the head 27 has passed over the image printed on the medium 99 and before the carriage 26 stops. Specifically, the control unit 28 may start the transport of the medium 99 by the transport unit 22 after a state is obtained in which the head 27 no longer overlaps with the image printed on the medium 99 when the support portion 17 is viewed in plan view, and before the carriage 26 stops. In this way, for example, when the printing is performed only on a portion of the printing region PA, the timing of starting the transport of the medium 99 can be brought forward compared to a case where the transport of the medium 99 by the transport unit 22 is started after the head 27 has passed over the printing region PA. Therefore, the productivity of the printing apparatus 11 is improved.

As illustrated in FIG. 6, the control unit 28 stops the carriage 26 at the return position. Specifically, the control unit 28 stops the carriage 26 that has reached the second position P2. At this time, the transport of the medium 99 is continued. Since the medium 99 is transported toward below the support portion 17, the medium 99 is less likely to come into contact with the head 27, which has passed over the printing region PA.

Figure 7:
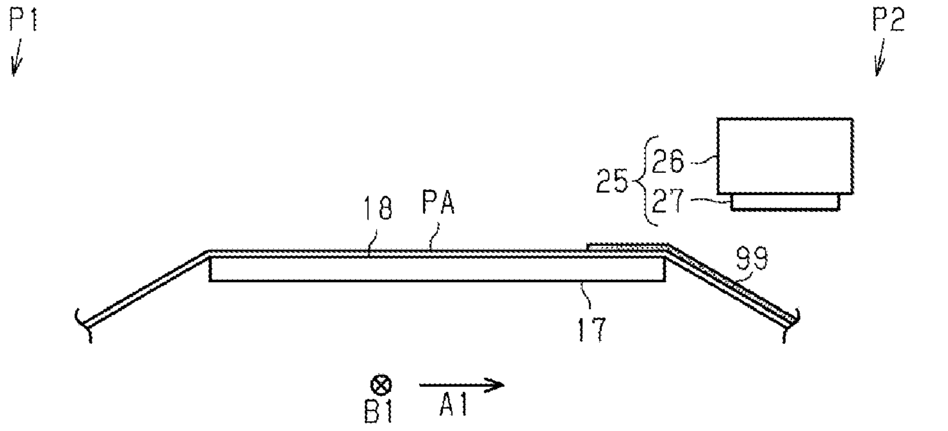
FIG. 7 is a side view when the carriage starts to move from the second position in the unidirectional printing in which the printing is performed on the outward path.

As illustrated in FIG. 7, the control unit 28 starts the movement of the carriage 26 positioned at the return position, for example, at the second position P2. Specifically, the control unit 28 returns the carriage 26 from the return position to the start position. In other words, the control unit 28 moves the carriage 26 from the second position P2 to the first position P1. As a result, the carriage 26 and the head 27 move on the return path.

The control unit 28 starts the movement of the carriage 26 before the transport of the medium 99 by the transport unit 22 is completed. In other words, the control unit 28 starts the movement of the carriage 26 in a state in which the medium 99 is being transported. The control unit 28 executes the movement of the carriage 26 in parallel with the transport of the medium 99. At this time, while the medium 99 moves in the transport direction A1, the carriage 26 moves in the direction opposite to the transport direction A1. As a result, the productivity of the printing apparatus 11 is improved compared to a case where the movement of the carriage 26 is started after the transport of the medium 99 is completed. The control unit 28 improves the productivity of the printing apparatus 11 by causing the movement period of the carriage 26 and the transport period of the medium 99 to coincide with each other.

Figure 8:
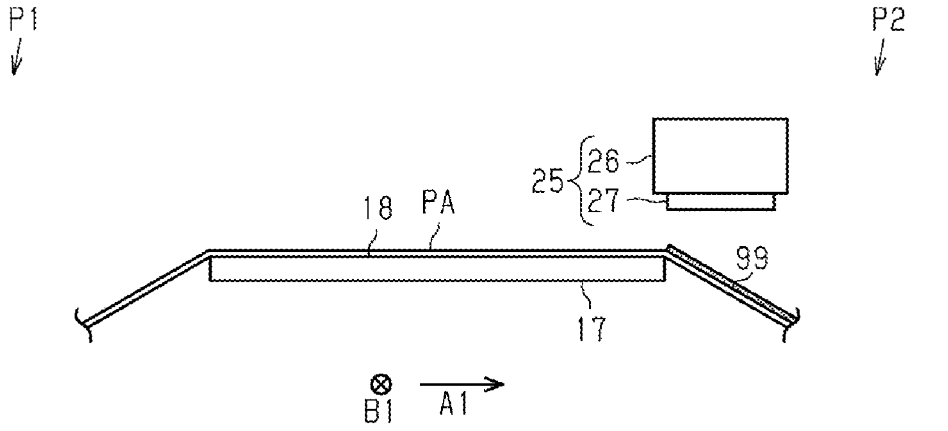
FIG. 8 is a side view when the carriage returns from the second position to the first position in the unidirectional printing in which the printing is performed on the outward path.

As illustrated in FIG. 7 and FIG. 8, the control unit 28 moves the carriage 26 so that the image printed on the medium 99 and the head 27 do not overlap with each other over the support portion 17 when the support portion 17 is viewed in plan view. The control unit 28 starts the movement of the carriage 26 so that the printed portion of the medium 99 has passed over the support portion 17 by the time when the head 27 reaches the support portion 17. The control unit 28 controls the timing of starting the movement of the carriage 26, for example, based on the time elapsed from when the transport of the medium 99 was started, or the rotation amount of the transport roller 23. The control unit 28 starts the movement of the carriage 26 after a predetermined time period has elapsed from when the transport of the medium 99 was started, or after the medium 99 has been transported by a predetermined amount.

As illustrated in FIG. 8, the control unit 28 stops transporting the medium 99 after the printed portion of the medium 99 has passed over the support portion 17. At this time, the movement of the carriage 26 is continued. After the carriage 26 has reached the start position, the control unit 28 starts the printing on the next printing region PA. In other words, the control unit 28 starts the discharge of the liquid by the head 27 after the transport of the medium 99 by the transport unit 22 is completed. In the bidirectional printing, the control unit 28 performs the printing on the next printing region PA in the course of the carriage 26 returning from the return position to the start position.

Next, the case where the printing is performed on the return path will be described. Here, the control unit 28 causes the head 27 to discharge the liquid when the carriage 26 moves on the return path.

Figure 9:
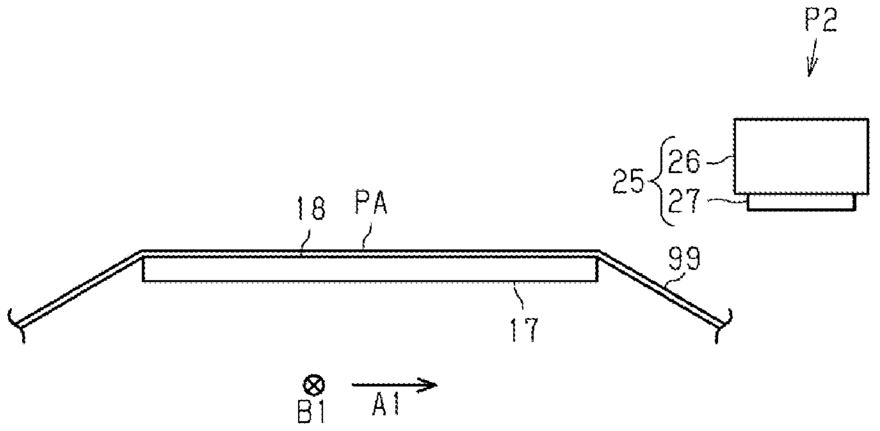
FIG. 9 is a side view when the carriage stands by at the second position in unidirectional printing in which the printing is performed on a return path.

As illustrated in FIG. 9, before the printing is started, the control unit 28 causes the carriage 26 to stand by at the start position, for example, at the second position P2. After that, the control unit 28 moves the carriage 26 from the start position to the return position. In other words, the control unit 28 moves the carriage 26 from the second position P2 to the first position P1. As a result, the carriage 26 and the head 27 move on the return path. At this time, the control unit 28 starts the movement of the carriage 26 in a state in which the medium 99 is stopped.

Figure 10:
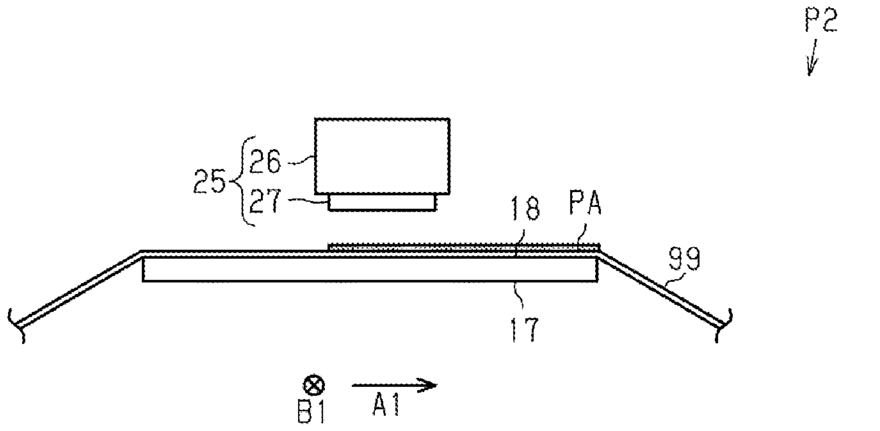
FIG. 10 is a side view when the printing is being performed in the unidirectional printing in which the printing is performed on the return path.

As illustrated in FIG. 10, the control unit 28 causes the head 27 to discharge the liquid as the carriage 26 moves over the printing area PA. As a result, an image is printed on the printing region PA. The control unit 28 causes the head 27 to discharge the liquid while moving the carriage 26 relative to the printing region PA.

Figure 11:
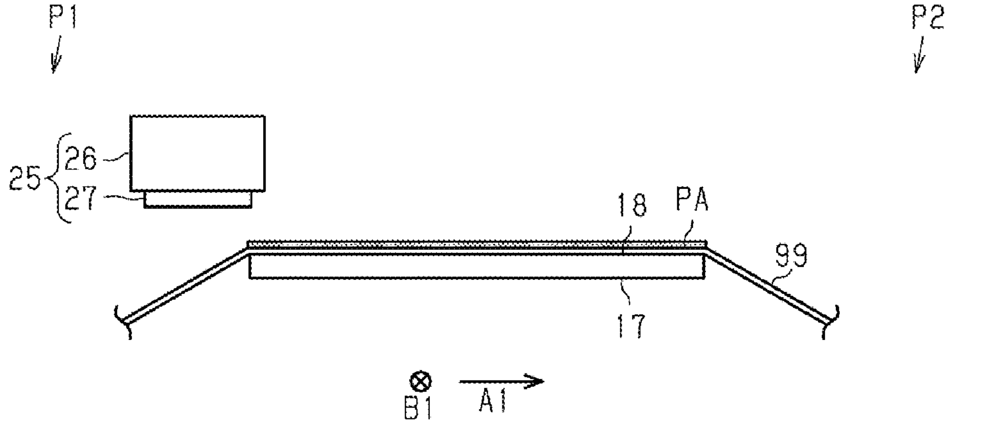
FIG. 11 is a side view of a state after the printing in the unidirectional printing in which the printing is performed on the return path.
Figure 12:
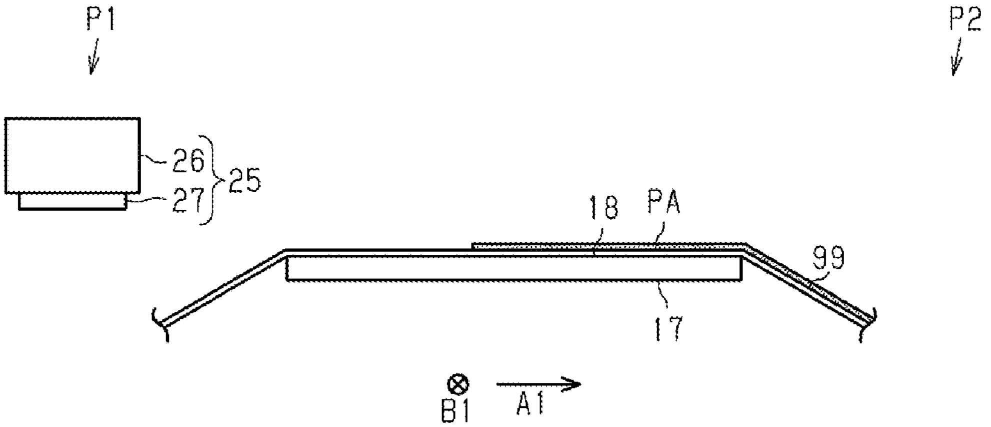
FIG. 12 is a side view when the carriage is positioned at the first position in the unidirectional printing in which the printing is performed on the return path.

As illustrated in FIG. 11 and FIG. 12, the control unit 28 starts the transport of the medium 99 by the transport unit 22 after the discharge of the liquid by the head 27 is completed and before the carriage 26 stops. The control unit 28 starts the transport of the medium 99 by the transport unit 22, for example, after the discharge of the liquid by the head 27 is completed, and before the carriage 26 reaches the first position P1. In other words, the control unit 28 executes the movement of the carriage 26 in parallel with the transport of the medium 99. At this time, while the carriage 26 moves in the opposite direction to the transport direction A1, the medium 99 moves in the transport direction A1. As a result, productivity of the printing apparatus 11 is improved compared to a case where the transport of the medium 99 is started after the carriage 26 stops. The control unit 28 improves the productivity of the printing apparatus 11 by causing the movement period of the carriage 26 and the transport period of the medium 99 to coincide with each other.

The control unit 28 may start the transport of the medium 99 by the transport unit 22, for example, after the head 27 has passed over the printing region PA and before the carriage 26 stops. Specifically, the control unit 28 may start the transport of the medium 99 by the transport unit 22 after the state is obtained in which the head 27 no longer overlaps with the printing region PA when the support portion 17 is viewed in plan view, and before the carriage 26 reaches the first position P1. By starting the transport of the medium 99 after the head has passed over the support portion 17, the risk of the printed portion of the medium 99 coming into contact with the head 27 is reduced.

The control unit 28 may start the transport of the medium 99 by the transport unit 22, for example, after the liquid last discharged from the head 27 has landed on the medium 99 and before the carriage 26 stops. By starting the transport of the medium 99 after the liquid last discharged from the head 27 has landed on the medium 99, the productivity of the printing apparatus 11 is improved while suppressing the deterioration in the printing quality.

The control unit 28 may start the transport of the medium 99 by the transport unit 22 after the head 27 has passed over the image printed on the medium 99 and before the carriage 26 stops. Specifically, the control unit 28 may start the transport of the medium 99 by the transport unit 22 after a state is obtained in which the head 27 no longer overlaps with the image printed on the medium 99 when the support portion 17 is viewed in plan view, and before the carriage 26 stops. In this way, for example, when the printing is performed only on a portion of the printing region PA, the timing of starting the transport of the medium 99 can be brought forward compared to a case where the transport of the medium 99 by the transport unit 22 is started after the head 27 has passed over the printing region PA. Therefore, the productivity of the printing apparatus 11 is improved.

As illustrated in FIG. 12, the control unit 28 stops the carriage 26 at the return position. Specifically, the control unit 28 stops the carriage 26 that has reached the first position P1. At this time, the transport of the medium 99 is continued. Since the medium 99 is transported toward the support portion 17 from below the support portion 17, the medium 99 is less likely to come into contact with the head 27, which has passed over the printing region PA.

Figure 13:
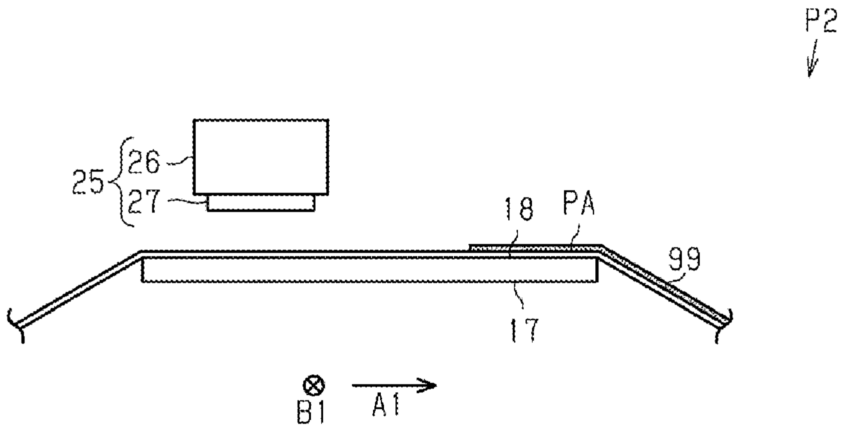
FIG. 13 is a side view when the carriage starts to move from the first position in the unidirectional printing in which the printing is performed on the return path.

As illustrated in FIG. 13, the control unit 28 starts the movement of the carriage 26 positioned at the return position, for example, at the first position P1. Specifically, the control unit 28 returns the carriage 26 from the return position to the start position. In other words, the control unit 28 moves the carriage 26 from the first position P1 to the second position P2. As a result, the carriage 26 and the head 27 move on the outward path.

The control unit 28 starts the movement of the carriage 26 before the transport of the medium 99 by the transport unit 22 is completed. In other words, the control unit 28 starts the movement of the carriage 26 in a state in which the medium 99 is being transported. The control unit 28 executes the movement of the carriage 26 in parallel with the transport of the medium 99. At this time, while the medium 99 moves in the transport direction A1, the carriage 26 moves in the transport direction A1. As a result, the productivity of the printing apparatus 11 is improved compared to the case where the movement of the carriage 26 is started after the transport of the medium 99 is completed. The control unit 28 improves the productivity of the printing apparatus 11 by causing the movement period of the carriage 26 and the transport period of the medium 99 to coincide with each other.

The control unit 28 moves the carriage 26 so that the image printed on the medium 99 and the head 27 do not overlap with each other over the support portion 17 when the support portion 17 is viewed in plan view. The control unit 28 moves the carriage 26 so that the head 27 does not catch up with the printed portion of the medium 99. This is because, when the head 27 catches up with the printed portion of the medium 99, the head 27 may come into contact with the printed portion. The control unit 28 moves the carriage 26 so that the printed portion of the medium 99 and the head 27 do not overlap with each other over the support portion 178, for example, by controlling the timing of starting the movement of the carriage 26, or by controlling the movement velocity of the carriage 26.

Figure 14:
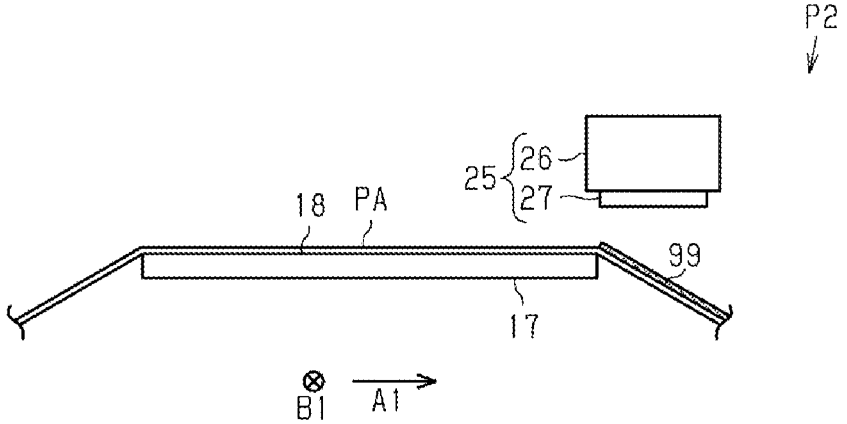
FIG. 14 is a side view when the carriage returns from the first position to the second position in the unidirectional printing in which the printing is performed on the return path.

As illustrated in FIG. 14, the control unit 28 stops the transport of the medium 99 after the printed portion of the medium 99 has passed over the support portion 17. At this time, the movement of the carriage 26 is continued. After the carriage 26 has reached the start position, the control unit 28 starts the printing on the next printing region PA. In other words, the control unit 28 starts the discharge of the liquid by the head 27 after the transport of the medium 99 by the transport unit 22 is completed. In the bidirectional printing, the control unit 28 performs the printing on the next printing region PA during a period in which the carriage 26 returns from the return position to the start position.

Operations and Effects of Printing Apparatus

Next, operations and effects of the exemplary embodiment described above will be described.

(1) The control unit 28 causes the head 27 to discharges the liquid while moving the carriage 26 relative to the printing region PA. The control unit 28 starts the transport of the medium 99 by the transport unit 22 after the discharge of the liquid by the head 27 is completed and before the carriage 26 stops. According to the configuration described above, the productivity of the printing apparatus 11 is improved compared to the case where the transport of the medium 99 by the transport unit 22 is started after the carriage 26 stops.

(2) The control unit 28 starts the movement of the carriage 26 before the transport of the medium 99 by the transport unit 22 is completed. The control unit 28 starts the discharge of the liquid by the head 27 after the transport of the medium 99 by the transport unit 22 is completed. According to the configuration described above, the productivity of the printing apparatus 11 is improved compared to the case where the movement of the carriage 26 is started after the transport of the medium 99 by the transport unit 22 is completed.

(3) The control unit 28 moves the carriage 26 so that the image printed on the medium 99 and the head 27 do not overlap with each other over the support portion 17 when the support portion 17 is viewed from a position facing the support portion 17.

The medium 99 may swell as a result of the liquid being discharged onto the medium 99. When the medium 99 swells, the medium 99 and the head 27 are more likely to come into contact with each other. According to the configuration described above, since the carriage 26 moves so that the image printed on the medium 99 and the head 27 do not overlap with each other over the support portion 17, the risk of the head 27 coming into contact with the medium 99 is reduced.

(4) The control unit 28 performs the unidirectional printing on the medium 99 by controlling the head 27 and the carriage 26. The control unit 28 causes the head 27 to discharge the liquid when the carriage 26 moves on the outward path. According to the configuration described above, when the head 27 discharges the liquid on the outward path in the unidirectional printing, the productivity of the printing apparatus 11 is improved.

(5) The control unit 28 performs the unidirectional printing on the medium 99 by controlling the head 27 and the carriage 26. The control unit 28 causes the head 27 to discharge the liquid when the carriage 26 moves on the return path. According to the configuration described above, when the head 27 discharges the liquid on the return path in the unidirectional printing, the productivity of the printing apparatus 11 is improved.

(6) The transport unit 22 transports the medium 99 in the direction in which the carriage 26 moves over the support portion 17. The transport unit 22 transports a portion, of the medium 99, that has passed over the support portion 17 toward below the support portion 17.

According to the configuration described above, the printed portion of the medium 99 is transported so as to be below the support portion 17. As a result, the risk of the image printed on the medium 99 coming into contact with the head 27 is reduced.

(7) The head 27 is a line head capable of simultaneously discharging the liquid across the entire width of the medium 99, and performs the printing on the printing region PA in a single pass. According to the configuration described above, the productivity of the printing apparatus 11 is improved compared to a case where the head 27 performs the printing in multiple passes.

(8) The control unit 28 starts the transport of the medium 99 by the transport unit 22 after the head 27 has passed over the printing region PA and before the carriage 26 stops.

According to the configuration described above, since the transport of the medium 99 by the transport unit 22 is started after the head 27 has passed over the printing region PA, the risk of the image printed on the medium 99 coming into contact with the head 27 is reduced.

(9) The control unit 28 starts the transport of the medium 99 by the transport unit 22 after the liquid last discharged from the head 27 has landed on the medium 99 and before the carriage 26 stops.

When the transport of the medium 99 by the transport unit 22 is started before the liquid discharged from the head 27 lands on the medium 99, the printing quality may deteriorate. In this regard, according to the configuration described above, the productivity of the printing apparatus 11 is improved while suppressing the deterioration in the printing quality.

(10) The control unit 28 starts the transport of the medium 99 by the transport unit 22 after the discharge of the liquid by the head 27 is completed, after the head 27 has passed over the image printed on the medium 99, and before the carriage 26 stops.

According to the configuration described above, for example, when the printing is performed only on a portion of the printing region PA, the timing of starting the transport of the medium 99 can be brought forward compared to the case where the transport of the medium 99 by the transport unit 22 is started after the head 27 has passed over the printing region PA. As a result, the productivity of the printing apparatus 11 is improved.

Modified Examples

This exemplary embodiment can be modified and implemented as described below. This exemplary embodiment and modified examples described below can be combined and implemented within a range in which a technical contradiction does not arise.

Figure 15:
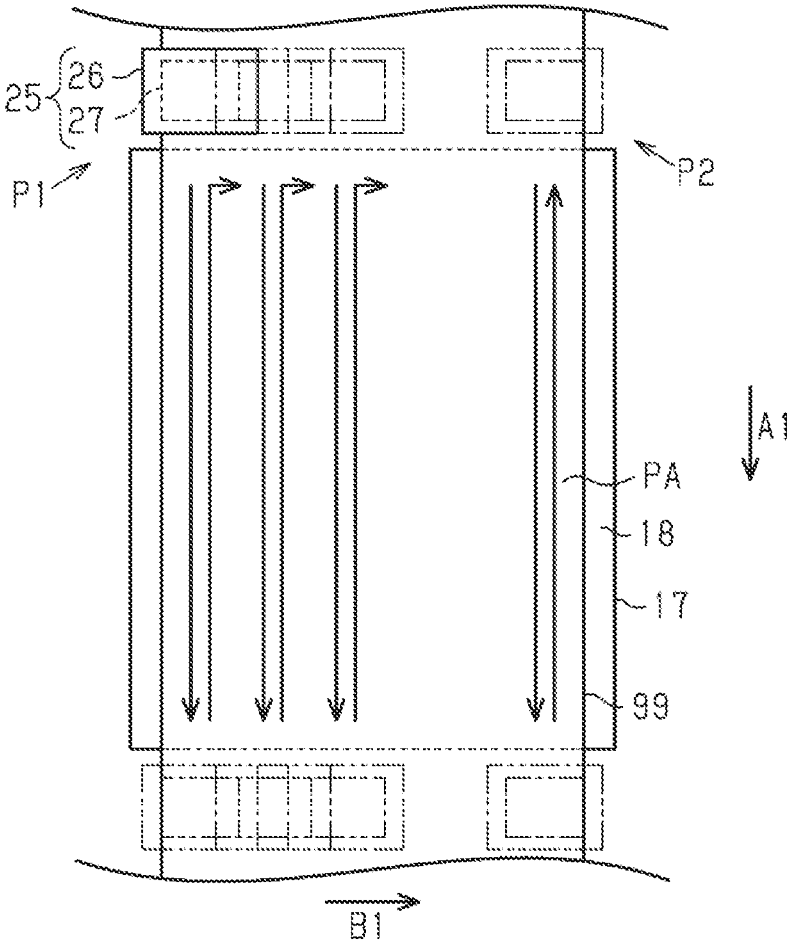
FIG. 15 is a plan view illustrating a modified example of the printing apparatus.

As illustrated in FIG. 15, the printing unit 25 may perform the printing on the printing region PA by moving in the transport direction A1 and the intersecting direction B1. In this modified example, the width of the head 27 is shorter than the width of the medium 99. The printing unit 25 performs the printing on the printing region PA, for example, by repeating the movement in the transport direction A1 and the provision of the line feed in the intersecting direction B1.

The carriage 26 moves in the transport direction A1 relative to the medium 99 a plurality of times in the one print cycle. The carriage 26 moves from the first position P1, which is the start position, to the second position P2, which is the end position, by repeating the movement in the transport direction A1 and the movement in the intersecting direction B1. The end position is a position at which the carriage 26 is ultimately positioned when the one print cycle is completed. The end position is positioned upstream from the support portion 17 in the transport direction A1, for example. The end position is a position different from the start position in the intersecting direction B1.

The head 27 discharges the liquid when the head 27 moves together with the carriage 26 in the transport direction A1 or in the opposite direction thereto. The head 27 performs the printing on the medium 99 by moving in the transport direction A1 a plurality of times while shifting its position in the intersecting direction B1. In the example illustrated in FIG. 15, the printing apparatus 11 performs the printing on a region corresponding to one raster on the medium 99 in a single pass, using the unidirectional printing method. Here, the region corresponding to one raster is a region in which the head 27 and the medium 99 overlap with each other when the head 27 is moved once in the transport direction A1. When the printing is performed on the region corresponding to one raster in multiple passes, the movement amount of the carriage 26 moving in the intersecting direction B1 decreases, and the number of movements of the carriage 26 increases. The carriage 26 may move in the intersecting direction B1 after completing its movement on the outward path in the transport direction A1, or may move in the intersecting direction B1 after completing its movement on the return path in the transport direction A1. The printing apparatus 11 may perform the bidirectional printing on the medium 99.

The control unit 28 starts the transport of the medium 99 by the transport unit 22 after the head 27 has completed the printing and before the carriage 26 reaches the end position.

In this modified example, at the time at which the printing by the head 27 is completed, the carriage 26 has already made the last movement in the direction parallel to the transport direction A1. Therefore, the control unit 28 starts the transport of the medium 99 by the transport unit 22 after the head 27, which is moving together with the carriage 26 in the last movement, has passed over the printing region PA, and before the carriage 26 reaches the end position.

The control unit 28 starts the movement of the carriage 26 before the transport of the medium 99 by the transport unit 22 is completed. The control unit 28 moves the carriage 26 positioned at the end position, before the transport of the medium 99 by the transport unit 22 is completed. For example, after the carriage 26 reaches the end position, the control unit 28 moves the carriage 26 in the opposite direction to the intersecting direction B1, while the medium 99 is being transported. As a result, the carriage 26 returns to the start position.

Figure 16:
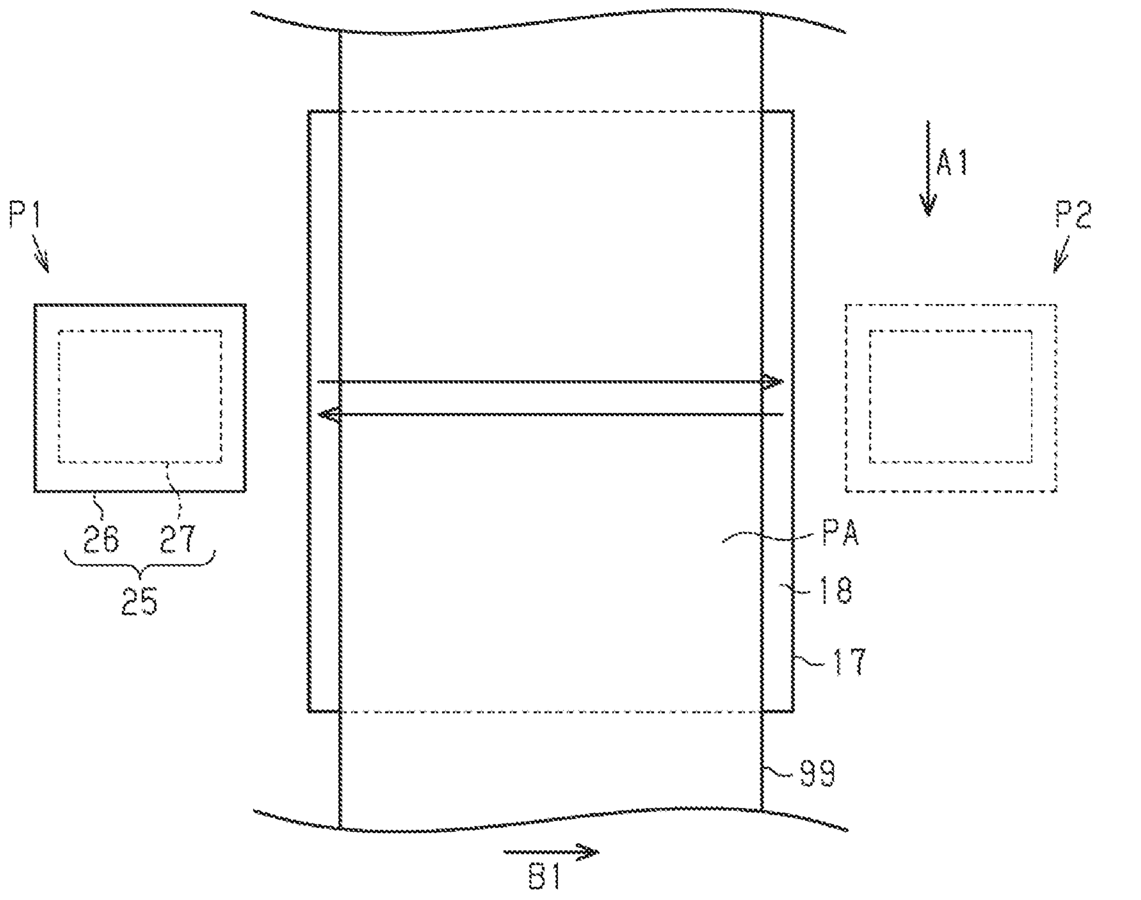
FIG. 16 is a plan view illustrating a modified example different from the modified example illustrated in FIG. 15.

As illustrated in FIG. 16, the printing apparatus 11 may be a serial printer. In this modified example, the printing unit 25 performs the printing on the printing region PA by moving in the intersecting direction B1. Specifically, the printing unit 25 performs the printing on the printing region PA by reciprocating in the intersecting direction B1.

The carriage 26 moves from the first position P1, which is the start position, to the second position P2, which is the end position, for example, by moving from one side to the other side in the intersecting direction B1. For example, the head 27 discharges the liquid when moving to the one side in the intersecting direction B1 together with the carriage 26, or when moving to the other side, which is in the opposite direction. In the example illustrated in FIG. 16, the printing apparatus 11 performs the printing on the medium 99 in a single pass, using the unidirectional printing method. When the printing is performed using multiple passes, the transport amount of the medium 99 by the transport unit 22 each time the medium 99 is transported decreases, and the number of times the medium 99 is transported by the transport unit 22 increases. As a result, the number of movements of the carriage 26 increases. The printing apparatus 11 may perform the bidirectional printing on the medium 99.

The control unit 28 starts the transport of the medium 99 by the transport unit 22 after the printing by the head 27 is completed and before the carriage 26 stops. For example, the transport of the medium 99 by the transport unit 22 is started after the head 27, which is moving together with the carriage 26 in the intersecting direction B1, has passed over the printing region PA, and before the carriage 26 stops.

The control unit 28 starts the movement of the carriage 26 before the transport of the medium 99 by the transport unit 22 is completed. The control unit 28 moves the carriage 26 positioned at the return position before the transport of the medium 99 by the transport unit 22 is completed. At this time, the control unit 28 moves the carriage 26 so that the head 27 does not overlap with the image printed on the medium 99 over the support portion 17. For example, after the carriage 26 reaches the return position, the control unit 28 moves the carriage 26 to the other side in the intersecting direction B1, in a state in which the medium 99 is being transported. At this time, the control unit 28 starts the movement of the carriage 26 so that, by the time when the head 27 reaches the support portion 17, the medium 99 is transported by an amount equivalent to the length of the head 27 in the transport direction A1. As a result, the head 27, which is moving together with the carriage 26 to the other side in the intersecting direction B1, does not overlap with the printed portion of the medium 99 over the support portion 17.

When transporting the medium 99 before the printing is started, the control unit 28 may move the carriage 26 before the transport of the medium 99 is completed. For example, after the transport of the medium 99 is completed, the control unit 28 starts the discharge of the liquid by the head 27 while continuing to move the carriage 26. As a result, a time required before starting the printing is shortened compared to a case where the movement of the carriage 26 is started after the transport of the medium 99 is completed. Therefore, the productivity of the printing apparatus 11 is improved.

The liquid discharged by the head 27 is not limited to ink, and may be, for example, a liquid material including particles of a functional material dispersed or mixed in liquid. For example, the head 27 may discharge a liquid material including a material such as an electrode material or a pixel material used in manufacturing a liquid crystal display, an electroluminescent (EL) display, a surface emitting display, and the like in a dispersed or dissolved form.

Technical Ideas

Technical ideas derived from the above-described exemplary embodiment and modified examples, and operations and advantages of the technical ideas will be described below.

(A) A printing apparatus includes a transport unit configured to intermittently transport a medium, a support portion configured to support the medium, a head configured to perform printing by discharging a liquid onto the medium supported by the support portion, during a period in which the transport of the medium by the transport unit is stopped, a carriage at which the head is mounted and that is configured to move relative to the medium, and a control unit. The control unit causes the head to discharge the liquid onto a printing region while moving the carriage, the printing region being a region, of the medium, supported by the support portion, and starts the transport of the medium by the transport unit after the discharge of the liquid by the head is completed and before the carriage stops.

According to the configuration described above, the printing speed is improved compared to a case where the transport of the medium by the transport unit is started after the discharge of the liquid by the head is completed and after the carriage 26 stops. Therefore, productivity of the printing apparatus is improved.

(B) In the printing apparatus described above, the control unit may start the movement of the carriage before the transport of the medium by the transport unit is completed, and may start the discharge of the liquid by the head after the transport of the medium by the transport unit is completed. According to the configuration described above, the printing speed is improved compared to a case where the movement of the carriage is started after the transport of the medium by the transport unit is completed. Therefore, the productivity of the printing apparatus is improved.

(C) In the printing apparatus described above, the control unit may move the carriage such that an image printed on the medium and the head do not overlap with each other above the support portion, when the support portion is viewed from a position facing the support portion.

The medium may swell as a result of the liquid being discharged onto the medium. When the medium swells, the medium and the head are more likely to come into contact with each other. According to the configuration described above, since the carriage moves so that the image printed on the medium and the head do not overlap with each other over the support portion, the risk of the head coming into contact with the medium is reduced.

(D) In the printing apparatus described above, the control unit may perform unidirectional printing on the medium by controlling the head and the carriage, and may cause the head to discharge the liquid when the carriage moves on an outward path. According to the configuration described above, when the head discharges the liquid on the outward path in the unidirectional printing, the productivity of the printing apparatus is improved.

(E) In the printing apparatus described above, the control unit may perform unidirectional printing on the medium by controlling the head and the carriage, and may cause the head to discharge the liquid when the carriage moves on a return path. According to the configuration described above, when the head discharges the liquid on the return path in the unidirectional printing, the productivity of the printing apparatus is improved.

(F) In the printing apparatus described above, the head and the carriage may be positioned above the support portion, and the transport unit may transport the medium on the support portion in a direction in which the carriage moves, and may transport a portion, of the medium, that passed over the support portion toward below the support portion. According to the configuration described above, the printed portion of the medium is transported so as to be below the support portion. As a result, the risk of the printed portion of the medium coming into contact with the head is reduced.

(G) In the printing apparatus described above, the head may be a line head configured to simultaneously discharge the liquid across an entire width of the medium, and may perform the printing on the printing region in a single pass. According to the configuration described above, the productivity of the printing apparatus is improved compared to a case where the head performs the printing in multiple passes.

(H) In the printing apparatus described above, the control unit may start the transport of the medium by the transport unit after the discharge of the liquid by the head is completed, after the head passed over the printing region, and before the carriage stops. According to the configuration described above, since the transport of the medium by the transport unit is started after the head has passed over the printing region, the risk of the printed portion of the medium coming into contact with the head is reduced.

(I) In the printing apparatus described above, the control unit may start the transport of the medium by the transport unit after the discharge of the liquid by the head is completed, after the liquid last discharged by the head landed on the medium, and before the carriage stops.

When the transport of the medium by the transport unit is started before the liquid discharged from the head lands on the medium, the printing quality may deteriorate. In this regard, according to the configuration described above, the productivity of the printing apparatus is improved while suppressing the deterioration in the printing quality.

(J) In the printing apparatus described above, the control unit may start the transport of the medium by the transport unit after the discharge of the liquid by the head is completed, after the head passed over an image printed on the medium, and before the carriage stops.

According to the configuration described above, for example, when the printing is performed only on a portion of the printing region, the timing of starting the transport of the medium can be brought forward compared to a case where the transport of the medium by the transport unit is started after the head passed over the printing region. As a result, the productivity of the printing apparatus is improved.

(K) A method of printing includes causing a head to discharge a liquid onto a printing region while moving a carriage, the printing region being a region, of a medium, supported by a support portion, and starting transport of the medium by a transport unit after the discharge of the liquid by the head is completed and before the carriage stops. According to the configuration described above, the same effects as those of the printing apparatus described above can be obtained.

(L) A printing apparatus includes a transport unit configured to intermittently transport a medium, a support portion configured to support the medium, a head configured to perform printing by discharging a liquid onto the medium supported by the support portion, during a period in which the transport of the medium by the transport unit is stopped, a carriage at which the head is mounted and that is configured to move relative to the medium, and a control unit. The control unit starts the movement of the carriage before the transport of the medium by the transport unit is completed, and starts the discharge of the liquid by the head after the transport of the medium by the transport unit is completed. According to the configuration described above, the printing speed is improved compared to a case where the movement of the carriage is started after the transport of the medium by the transport unit is completed. Therefore, the productivity of the printing apparatus is improved.

(M) In the printing apparatus described above, the control unit may move the carriage such that an image printed on the medium and the head do not overlap with each other above the support portion, when the support portion is viewed from a position facing the support portion.

The medium may swell as a result of the liquid being discharged onto the medium. When the medium swells, the medium and the head are more likely to come into contact with each other. According to the configuration described above, since the carriage moves so that the image printed on the medium and the head do not overlap with each other over the support portion, the risk of the head coming into contact with the medium is reduced.

(N) In the printing apparatus described above, the control unit may perform unidirectional printing on the medium by controlling the head and the carriage, and may cause the head to discharge the liquid when the carriage moves on an outward path. According to the configuration described above, when the head discharges the liquid on the outward path in the unidirectional printing, the productivity of the printing apparatus is improved.

(O) In the printing apparatus described above, the control unit may perform unidirectional printing on the medium by controlling the head and the carriage, and may cause the head to discharge the liquid when the carriage moves on a return path. According to the configuration described above, when the head discharges the liquid on the return path in the unidirectional printing, the productivity of the printing apparatus is improved.

(P) In the printing apparatus described above, the head and the carriage may be positioned above the support portion, and the transport unit may transport the medium on the support portion in a direction in which the carriage moves, and may transport a portion, of the medium, that passed over the support portion toward below the support portion. According to the configuration described above, the printed portion of the medium is transported so as to be below the support portion. As a result, the risk of the printed portion of the medium coming into contact with the head is reduced.

(Q) In the printing apparatus described above, the head may be a line head configured to simultaneously discharge the liquid across an entire width of the medium, and may perform the printing on the printing region in a single pass, the printing region being the region, of the medium, supported by the support portion.

According to the configuration described above, the productivity of the printing apparatus is improved compared to a case where the head performs the printing in multiple passes.

(R) A method of printing includes starting movement of a carriage before transport of a medium by a transport unit is completed, and starting discharge of a liquid by a head mounted at the carriage after the transport of the medium by the transport unit is completed. According to the method described above, the same effects as those of the printing apparatus described above can be obtained.

What is claimed is:

1. A printing apparatus comprising:

a transport unit configured to intermittently transport a medium;

a support portion configured to support the medium;

a head configured to perform printing by discharging a liquid onto the medium supported by the support portion, during a period in which the transport of the medium by the transport unit is stopped;

a carriage at which the head is mounted and that is configured to move in a transport direction of the medium; and a control unit configured to start the movement of the carriage before the transport of the medium by the transport unit is completed and start the discharge of the liquid by the head after the transport of the medium by the transport unit is completed, wherein the control unit moves the carriage such that an image printed on the medium and the head do not overlap with each other above the support portion, when the support portion is viewed from a position facing the support portion.

2. The printing apparatus according to claim 1, wherein the control unit:

performs unidirectional printing on the medium by controlling the head and the carriage and causes the head to discharge the liquid when the carriage moves on an outward path.

3. The printing apparatus according to claim 1, wherein the control unit:

performs unidirectional printing on the medium by controlling the head and the carriage and causes the head to discharge the liquid when the carriage moves on a return path.

4. The printing apparatus according to claim 1, wherein the head and the carriage are positioned above the support portion and the transport unit:

transports the medium on the support portion in the transport direction and transports a portion, of the medium, that passed over the support portion toward below the support portion.

5. The printing apparatus according to claim 1, wherein the head:

is a line head configured to simultaneously discharge the liquid across an entire width of the medium and performs the printing on a printing region in a single pass, the printing region being a region, of the medium, supported by the support portion.

6. A method of printing comprising:

starting movement of a carriage that is moving in a transport direction of a medium before transport of the medium by a transport unit is completed;

starting discharge of a liquid by a head mounted at the carriage after the transport of the medium by the transport unit is completed; and moving the carriage such that an image printed on the medium and the head do not overlap with each other above a support portion, when the support portion is viewed from a position facing the support portion.

* * * * *